C. H. BALCH.
SAFETY NECKLACE CLASP.
APPLICATION FILED MAY 9, 1917.

1,270,769.

Patented July 2, 1918.

Witnesses
W. Moore
P. H. Pattison.

Inventor
C. H. Balch

By Chandler & Chandler
Attorneys

UNITED STATES PATENT OFFICE.

CHARLES H. BALCH, OF BOSTON, MASSACHUSETTS.

SAFETY NECKLACE-CLASP.

1,270,769.  Specification of Letters Patent.  Patented July 2, 1918.

Application filed May 9, 1917.  Serial No. 167,570.

*To all whom it may concern:*

Be it known that I, CHARLES H. BALCH, a citizen of the United States, residing at Boston, in the county of Suffolk, State of Massachusetts, have invented certain new and useful Improvements in Safety Necklace-Clasps; and I do hereby declare the following to be a full, clear, and exact description of the invention, such as will enable others skilled in the art to which it appertains to make and use the same.

This invention relates to separable fastener, and pertains more particularly to that class of fasteners commonly employed for connecting the ends of jewelry chains especially adapted for personal wear.

A further object of the invention is to provide a device of this character in which the ends of the chain are more securely fastened together than in those devices at present commonly used.

Referring to the drawings.

Figure 1:
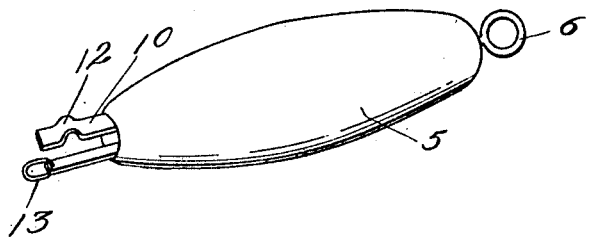
Figure 1 is a perspective view of the device.
Figure 2:
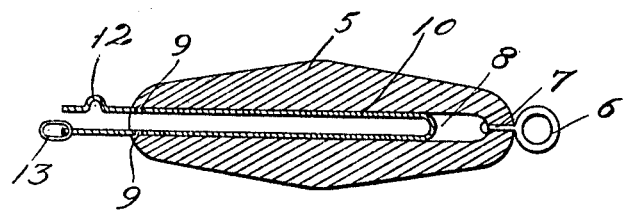
Fig. 2 is a longitudinal sectional view thereof.

Referring more particularly to the drawings the reference character 5 designates a socket member which is provided with an eye 6 swiveled as at 7 to one end thereof.

The socket member 5 is provided with an elongated rectangular socket 8, and projecting inwardly from the walls thereof are oppositely disposed pins 9, said pins being rigidly secured to the walls of the socket 8.

Figure 3:
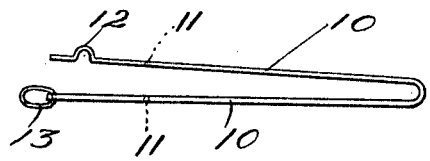
Fig. 3 is a detail view of the resilient member.

Referring to Fig. 3 it will be seen that a substantially U-shaped resilient member 10 is employed, each of the legs of which is provided with an aperture 11 near one end thereof. One of the legs 10 of the resilient member is provided with a thumb piece 12, while the other one is provided with an eye or ring 13. One end of the chain is attached to the U-shaped member 10 by means of the eye or ring 13, the other end of the chain being attached by passing one of its links through the swiveled eye 6 and the socket member.

In operation, the U-shaped member 10 is adapted to be inserted within the socket 8 of the socket member 5 until its oppositely disposed apertures 11 engage the oppositely disposed pins 9, at which time the resilient member 10 is permitted to expand and owing to the engagement of its apertures 11 with the pins 9, the same is prevented from accidental displacement with respect to the socket. If it be desired to disconnect the members it is only necessary to exert slight pressure upon the thumb piece 12 thus compressing the U-shaped member 10 until its oppositely disposed apertures 11 disengage the oppositely disposed pins 9 whereupon the U-shaped member 10 is free to be removed from the socket 8 of the socketed member. The socket 8 in the member 5 is of a uniform size in cross section throughout its length and the U-shaped resilient member 10 has its legs parallel with each other under normal conditions so that on the insertion of the member 10 in the socket 8, said legs of the resilient member will contact throughout the extent of the inserted portion of said member 10 with the opposed walls of the socket 8 thereby avoiding any wabbling of the resilient member when engaged in the socket member so that the chances of accidental detachment of the resilient member from the socket member is practically eliminated. The legs of the resilient member 10 each engages with the adjacent wall of the socket so that said member 10 is fastened at two points therein, thus it being seen that should one leg become disengaged the other leg of the member 10 will hold said member fast in the socket.

Having thus described the invention, what is claimed is:—

In a device of the character described, a socketed member, the socket in which is of uniform size in cross section throughout its length, a U-shaped resilient member removably inserted within the socket and having its legs substantially parallel and in contacting relation to opposite walls of said socket, retaining projections extending from opposite points interiorly of the socket and engaged with the legs of the resilient member, and means carried by said members for the connection of a chain therewith.

In testimony whereof, I affix my signature in the presence of two witnesses.

CHARLES H. BALCH.

Witnesses:
HERBERT C. WOODARD,
GEO. M. YOUNG.

*Copies of this patent may be obtained for five cents each, by addressing the "Commissioner of Patents, Washington, D. C."*